US008854198B2

(12) United States Patent
Tengler et al.

(10) Patent No.: US 8,854,198 B2
(45) **Date of Patent: *Oct. 7, 2014**

(54) FORWARD VEHICLE BRAKE WARNING SYSTEM

(75) Inventors: Steve Tengler, Grosse Pointe Park, MI (US); Ronald Heft, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/337,169

(22) Filed: Dec. 17, 2008

(65) Prior Publication Data

US 2009/0096598 A1 Apr. 16, 2009

Related U.S. Application Data

(63) Continuation of application No. 11/280,403, filed on Nov. 17, 2005, now Pat. No. 7,486,199.

(51) Int. Cl.
*B60C 23/00* (2006.01)
*G08G 1/0965* (2006.01)
*G08G 1/16* (2006.01)

(52) U.S. Cl.
CPC .............. *G08G 1/161* (2013.01); *G08G 1/0965* (2013.01)
USPC .......................................... 340/436; 340/435

(58) Field of Classification Search
USPC ......... 340/435, 436, 438, 901, 902, 903, 905; 701/301
See application file for complete search history.

(56) References Cited

U.S. PATENT DOCUMENTS

| | | | | |
|---|---|---|---|---|
| 6,121,896 | A * | 9/2000 | Rahman | 340/902 |
| 6,731,925 | B2 | 5/2004 | Naboulsi | |
| 6,765,495 | B1 * | 7/2004 | Dunning et al. | 340/903 |
| 6,798,354 | B2 | 9/2004 | Schuessler | |
| 6,819,234 | B1 | 11/2004 | Bunker et al. | |
| 7,124,027 | B1 * | 10/2006 | Ernst et al. | 701/301 |
| 7,206,686 | B2 | 4/2007 | Sawamoto et al. | |
| 7,486,199 | B2 * | 2/2009 | Tengler et al. | 340/902 |
| 2002/0101337 | A1 | 8/2002 | Igaki et al. | |
| 2002/0105423 | A1 | 8/2002 | Rast | |
| 2002/0198660 | A1 | 12/2002 | Lutter et al. | |
| 2003/0060980 | A1 | 3/2003 | Prakah-Asante et al. | |
| 2003/0102997 | A1 | 6/2003 | Levin et al. | |
| 2003/0128112 | A1 | 7/2003 | Chow | |
| 2003/0141452 | A1 * | 7/2003 | Musiel et al. | 250/330 |
| 2004/0119634 | A1 | 6/2004 | Samukawa et al. | |

(Continued)

OTHER PUBLICATIONS

Clarus Weather System Design High Level System Requirements Specification; Jun. 2005; Mixon/Hill, Inc. Kansas, U.S.A.

*Primary Examiner* — Travis Hunnings
(74) *Attorney, Agent, or Firm* — Global IP Counselors, LLP

(57) ABSTRACT

A forward vehicle brake warning system includes an incoming message receiving component, an adverse driving condition obtaining component, an incoming message relevancy component, a relevancy adjustment component and a driver warning component. The incoming message receiving component is configured to receive hard brake messages from neighboring vehicles located within a prescribed communication region around a host vehicle. The adverse driving condition obtaining component is configured to receive driving condition information affecting drivability of the host vehicle. The incoming message relevancy component is configured to perform a relevancy determination of the hard brake messages. The relevancy adjustment component is configured to adjust the relevancy determination to selectively filter the hard brake messages received depending upon the driving condition information. The driver warning component configured to alert a driver of the host vehicle.

22 Claims, 11 Drawing Sheets

(56) References Cited

U.S. PATENT DOCUMENTS

| | | | | |
|---|---|---|---|---|
| 2004/0245853 | A1* | 12/2004 | Odagawa et al. | 303/191 |
| 2004/0254728 | A1* | 12/2004 | Poropat | 701/301 |
| 2005/0122251 | A1 | 6/2005 | Shimomura | |
| 2005/0218564 | A1 | 10/2005 | Nahill et al. | |
| 2006/0114123 | A1 | 6/2006 | Eckstein et al. | |
| 2006/0155469 | A1 | 7/2006 | Kawasaki | |
| 2007/0008095 | A1 | 1/2007 | Gwinn et al. | |
| 2007/0080829 | A1 | 4/2007 | Biesinger et al. | |

* cited by examiner

FORWARD VEHICLE BRAKE WARNING SYSTEM

This application is a continuation of U.S. patent application Ser. No. 11/280,403 filed Nov. 17, 2005.

BACKGROUND OF THE INVENTION

1. Field of the Invention

The present invention generally relates to a forward vehicle brake warning system. More specifically, the present invention relates to a host vehicle using a vehicle to vehicle communication system that gives a warning to an operator of the host vehicle of potential danger ahead by processing messages from neighboring vehicles to determine if one or more of the neighboring vehicles ahead of the host vehicle has suddenly applied its brakes.

2. Background Information

Recently, vehicles are being equipped with a variety of informational systems such as navigation systems, Sirius and XM satellite radio systems, the so-called CLARUS weather information system, two-way satellite services, built-in cell phones, DVD players and the like. These systems are sometimes interconnected for increased functionality. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

Accordingly, DSRC technology can be used to provide various information between vehicles, such as providing GPS location, vehicle speed and other vehicle Parameter Identifiers (PIDs) including engine speed, engine run time, brake engagement, engine coolant temperature, barometric pressure, etc. When communications are established from one vehicle to other vehicles in close proximity, this information would be communicated between the vehicles to provide the vehicles with a complete understanding of the vehicles in the broadcast area. This information then can be used by the vehicles for both vehicle safety applications and non-safety applications.

In vehicle safety applications, a “Common Message Set” (CMS) would mostly likely be developed in which a prescribed set of vehicle Parameter Identifiers (PIDs) are broadcast by each vehicle to give relevant kinematical and location information such as GPS location/vehicle position, vehicle speed, vehicle dimensions etc. Once a potential safety concern is determined to exist, a warning system in the vehicles would notify the driver of the potential safety concern so that the driver can take the appropriate action.

In view of the above, it will be apparent to those skilled in the art from this disclosure that there exists a need for an improved set of communication related tools that can interpret and utilize the information broadcast by neighboring vehicles. This invention addresses this need in the art as well as other needs, which will become apparent to those skilled in the art from this disclosure.

SUMMARY OF THE INVENTION

It has been discovered that in order to improve road safety, signals transmitted from a forward vehicle indicating a hard brake condition received by a host vehicle can be used to warn the driver of the host vehicle of an imminent stop or speed reduction of the forward vehicle.

One object of the present invention is to provide a forward vehicle brake warning system that improves safety conditions on highways.

In accordance with one aspect of the present invention, a forward vehicle brake warning system includes an incoming message receiving component, an adverse driving condition obtaining component, an incoming message relevancy component, a relevancy adjustment component and a driver warning component. The incoming message receiving component is configured to receive hard brake messages from neighboring vehicles located within a prescribed communication region around a host vehicle equipped with the forward vehicle brake warning system. The adverse driving condition obtaining component is configured to receive driving condition information affecting drivability of the host vehicle. The incoming message relevancy component is configured to perform a relevancy determination of the hard brake messages received by the incoming message receiving component. The relevancy adjustment component is configured to adjust the relevancy determination to selectively filter the hard brake messages received depending upon the driving condition information. The driver warning component is configured to alert a driver of the host vehicle based upon the relevancy determination by the incoming message relevancy component.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
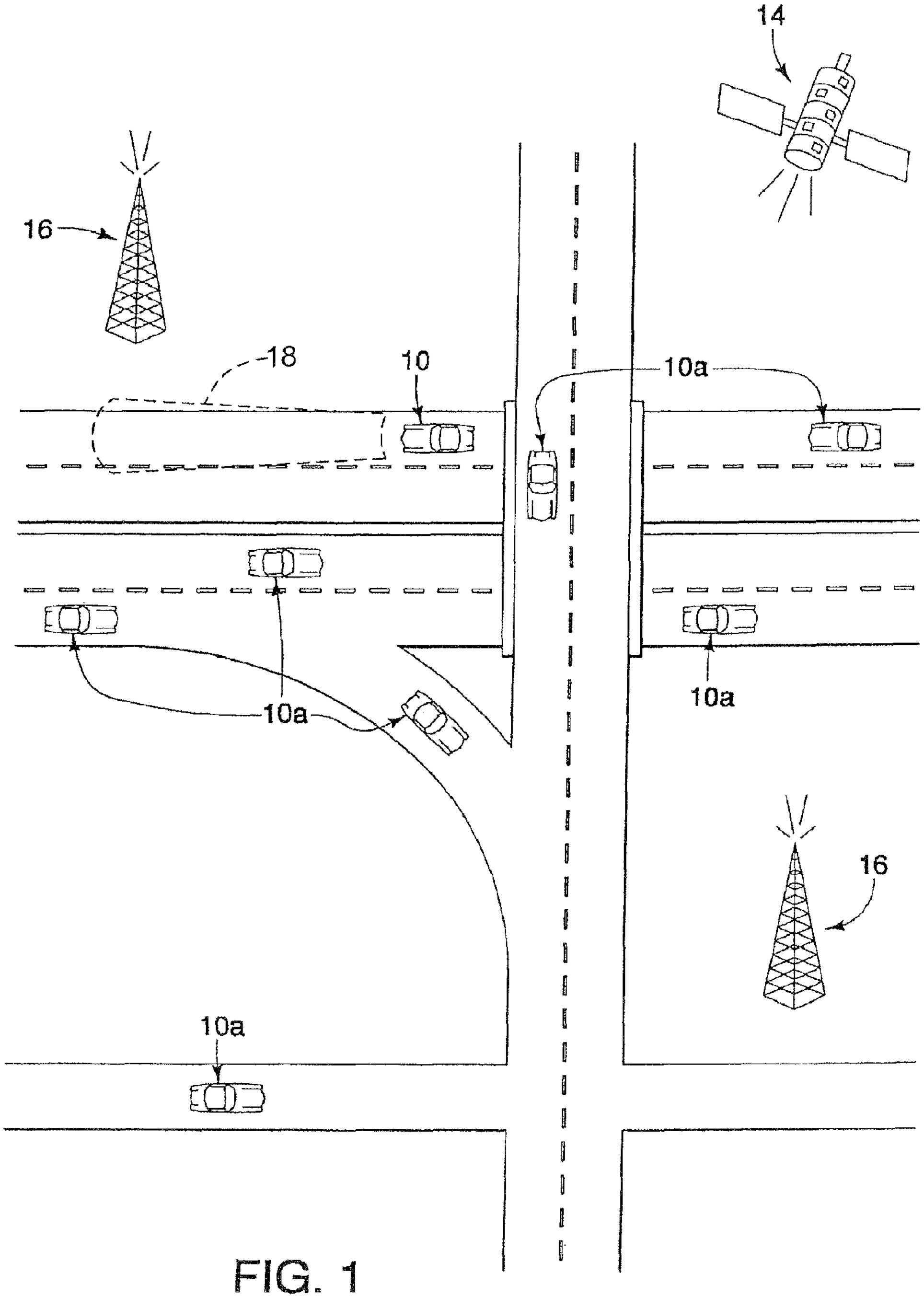
FIG. 1 is a pictorial representation of a two-way wireless communications (DSRC) network showing a plurality of vehicles each being equipped with an on-board unit capable of conducting two-way wireless communications, with an adjustable zone of interest depicted forward of a host vehicle in accordance with the present invention.
Figure 2:
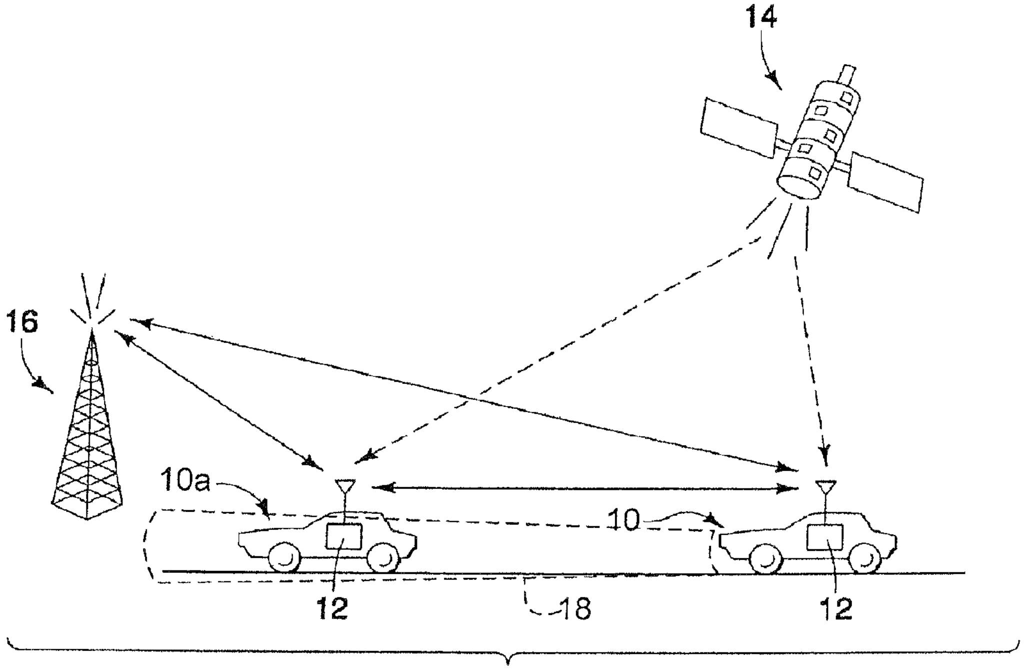
FIG. 2 is a pictorial representation of a two-way wireless communications (DSRC) network showing a pair of vehicles broadcasting and receiving vehicle parameter identifiers from each other, and receiving information from a satellite and/or a roadside unit, with a forward of the pair of vehicles being located within the zone of interest of the host vehicle (or rear vehicle) in accordance with the present invention.

Referring initially to FIGS. 1 and 2, a two-way wireless communications network is illustrated in which a host vehicle 10 and several neighboring or nearby vehicles 10*a* are each equipped with a vehicle communication system 12 in accordance with a preferred embodiment of the present invention. The two-way wireless communications network also includes one or more global positioning satellites 14 (only one shown) and one or more roadside units 16 (only two shown) that send and receive signals to and from the vehicles 10 and 10*a*. In this system, the term "host vehicle" refers to a vehicle among a group of DSRC equipped vehicles or vehicles equipped with two-way wireless communications in accordance with the present invention. The term "forward vehicle(s)" or "preceding vehicle(s)" refers to a vehicle or vehicles equipped with two-way wireless communications that are located in front of the host vehicle, while the term "following vehicle(s)" refers to a vehicle or vehicles equipped with two-way wireless communications that are behind the host vehicle relative to its direction of travel. The term "neighboring vehicle" refers to DSRC equipped vehicles or vehicles equipped with two-way wireless communications that are located within a communication (broadcasting/receiving) area surrounding the host vehicle in which the host vehicle is capable of either broadcasting a signal to another vehicle within a certain range and/or receiving a signal from another vehicle within a certain range. Accordingly, the "host vehicle" is equipped with a forward vehicle brake warning system that provide a warning an operator of the host vehicle 10 that a neighboring vehicle 10*a* or forward vehicles in or proximate the path of the host vehicle 10 is currently braking or decelerating at a potentially dangerous rate in accordance with the present invention.

The term "hard brake signal" refers to a signal sent from one or more of the neighboring vehicles 10*a* equipped with DSRC communications indicating that the brakes of the neighboring vehicle(s) have suddenly and/or rapidly been engaged to quickly decrease velocity (decelerate) of the neighboring vehicle(s) 10*a*.

It should be understood that all vehicles equipped with DSRC communications can be either the host vehicle 10 or one of the neighboring vehicles 10*a*. However, for the purposes of explaining the present invention, the host vehicle 10 is primarily a vehicle that is receiving and processing hard brake signals and neighboring vehicles 10*a* are generally vehicles that are likely to transmit a hard brake signal.

The term "zone of interest" refers to an area forward of the host vehicle 10 that lies along and possibly on either side of a path coinciding with a current direction of travel of the host vehicle 10. In accordance with the present invention, the zone of interest is an area that can be periodically, regularly or continuously adjusted and re-dimensioned by the host vehicle 10 in accordance with continuously monitored current road conditions, visibility conditions and/or host vehicle operating conditions. One example of a zone of interest 18 is indicated in FIG. 1 forward from the vehicle 10. In accordance with the present invention, the host vehicle 10 processes information in order to adjust and re-dimension the zone of interest 18 as described below. For example, as described below, the host vehicle 10 can receive remotely broadcast weather related information, or can use information provided from sensors on or within the host vehicle 10 in order to adjust and re-dimension the zone of interest 18.

As explained below, the forward vehicle brake warning system 12 of the host vehicle 10 is configured and arranged to communicate with and receive signals from other DSRC equipped vehicles 10*a*. When a neighboring vehicle 10*a* equipped with DSRC transmits a hard braking signal, the forward vehicle brake warning system 12 of the host vehicle 10 determines whether or not the neighboring vehicle 10*a* is located within the current zone of interest 18, as seen in FIG. 2. If the neighboring vehicle 10*a* is within the zone of interest, a warning action is implemented in order warn the operator of the host vehicle 10 of a potential forward collision event. The warning action is controlled electrically by the forward vehicle brake warning system 12.

A "forward collision" as used herein is defined as an on-road, two or more vehicle collision in which the vehicles are moving forward in the same direction prior to the collision or a collision in which a vehicle in the zone of interest 18 has stopped or is in the process of stopping, having transmitted or broadcast a hard braking signal. The forward vehicle brake warning system 12 of the present invention attempts to warn the operator of the host vehicle 10 of the sudden braking or deceleration of the other vehicle in order to avoid an impending forward collision or at least reduce the likelihood of serious consequences resulting from such a collision.

As seen in FIG. 2, the forward vehicle brake warning system 12 of each of the vehicles 10 and 10*a* carries out two-way wireless communications between each other as well as with one or more global positioning satellites 14 (only one shown) and one or more roadside units 16 (only one shown). The global positioning satellites 14 and the roadside units 16 are conventional components that are known in the art. The roadside units 16 are be equipped with a DSRC unit for broadcasting and receiving signals to the vehicles 10 located with communication (broadcasting/receiving) regions surrounding the roadside units 16. Since global positioning satellites and roadside units are known in the art, the structures of the global positioning satellites 14 and the roadside units 16 will not be discussed or illustrated in detail herein. Rather, it will be apparent to those skilled in the art from this disclosure that the global positioning satellites 14 and the roadside units 16 can be any type of structure that can be used to carry out the present invention.

Figure 3:
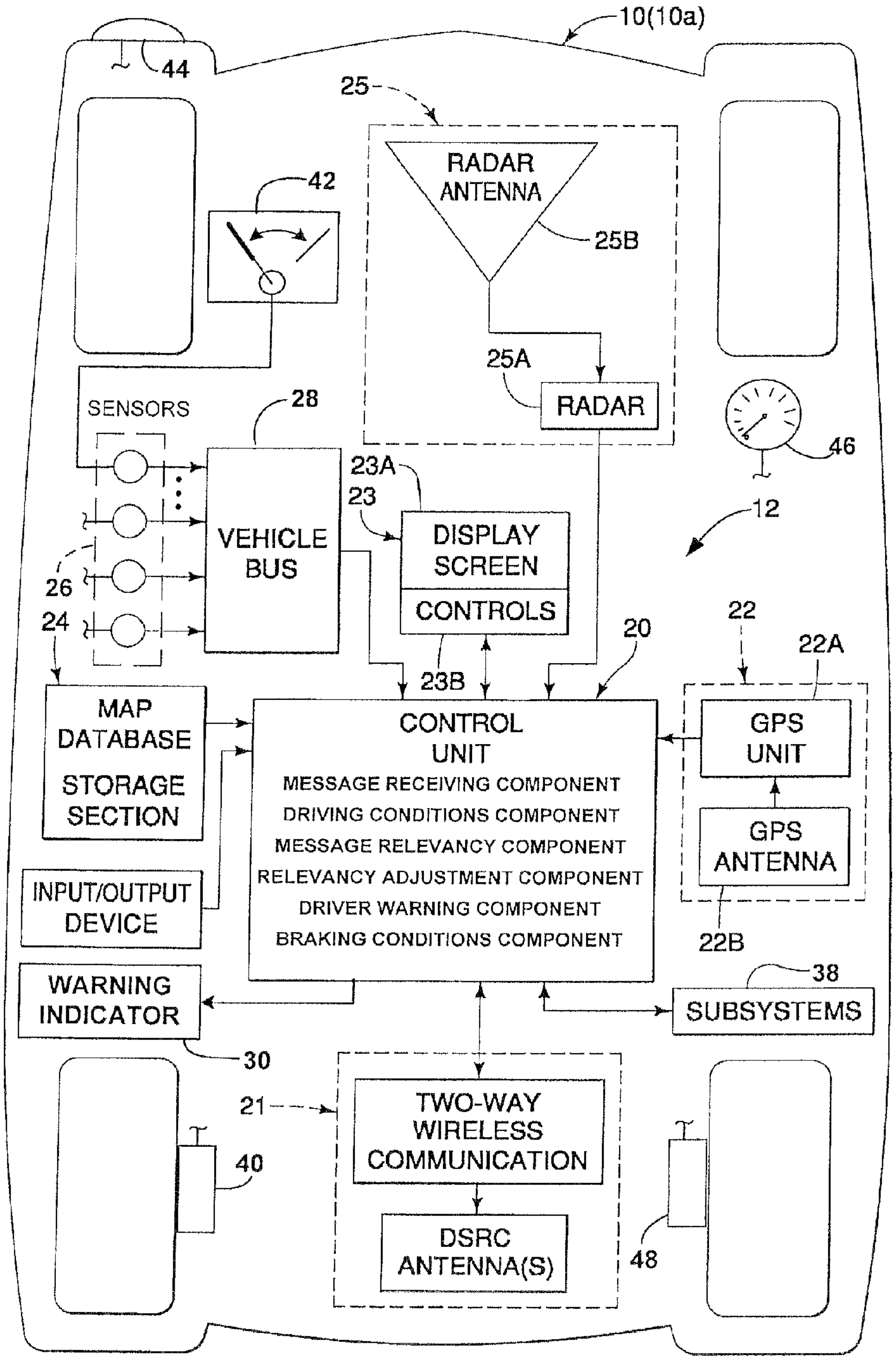
FIG. 3 is a schematic representation of the host vehicle equipped with the on-board unit for conducting two-way wireless communications and a control unit in accordance with the present invention.

Referring now to FIG. 3, the forward vehicle brake warning system 12 is a vehicle on-board unit (OBU) that basically includes a controller or control unit 20, a two-way wireless communications system 21, a global positioning system 22, a navigation system 23, a map database storage section or component 24, an optional forward obstacle detection component or system 25, an array of in-vehicle sensors 26 that communicate sensed information to the control unit 20 via a vehicle bus 28, and a warning indicator 30.

These systems or components are configured and arranged such that the control unit 20 receives and/or sends various signals to the other component and systems in order to filter messages received from neighboring vehicles 10*a* to determine: whether or not one of the received messages is from a neighboring vehicle 10*a*; whether or not that vehicle 10*a* is located in the zone of interest 18, and whether or not that message includes a hard braking signal indicating a possible danger for the host vehicle 10. In particular, the control unit 20 is configured and/or programmed to carry out this process by executing the steps shown in the flow chart of FIG. 7 (discussed below) in conjunction with various signals to and from the other components and systems. It will be apparent to those skilled in the art from this disclosure that the neighboring or nearby vehicles 10*a* are also equipped in a similar or the same manner as the host vehicle 10 and perform similar or the same processes as described herein.

The control unit 20 preferably includes a microcomputer with forward brake warning programming that controls the warning indicator 30 to warn an operator of the host vehicle 10 in response to a hard brake signal or signals received from a neighboring vehicle 10*a* within the zone of interest 18 indicating a potential collision event is likely to occur due to the hard braking condition in one or more neighboring vehicle 10*a*. The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communications system 21, the global positioning system 22, the navigation system 23, the map database storage section 24, the optional forward obstacle detection component 25, the in-vehicle sensors 26 and the warning indictor 30 that are run by the processor(s). The control unit 20 is capable of selectively controlling any of the components of the forward vehicle brake warning system 12 as needed and/or desired. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 20 preferably includes a program that has an incoming message receiving component or section, an adverse driving condition obtaining component or section, an incoming message relevancy component or section, a relevancy adjustment component or section, a driver warning component or section and a braking condition detection component or section. Based on various signals from the two-way wireless communications system 21, the global positioning system 22, the navigation system 23, the map database storage section 24, the optional forward obstacle detection component 25 and the in-vehicle sensors 26, these components or sections will determine whether or not warning action should be implemented by the control unit 20, such as activation of the warning indicator 30.

The control unit 20 of the forward vehicle brake warning system 12 is configured to determine whether or not a warning signal should be provided to the operator of the host vehicle 10 by first detecting whether or not a hard braking signal has been received from one or more of the neighboring vehicles 10*a*. If a hard braking signal or signals has been received, the control unit 20 performs a process where the zone of interest 18 is adjusted based upon acquired information relating to road conditions, weather conditions and/or vehicle operating conditions. The information processed by the control unit 20 is provided by one or more of the following: the vehicle parameter identifiers transmitted from the neighboring vehicles 10*a*, weather conditions from the roadside units 16, adverse driving conditions from the roadside units 16, and/or signals from the array of in-vehicle sensors 26 within the host vehicle 10. The forward vehicle brake warning system 12 filters the received signals by determining whether or not the neighboring vehicle 10*a* that transmitted the hard braking signal is located within the adjusted zone of interest 18. If the transmitting vehicle is located within the zone of interest, a warning action is effected to warn the operator or driver of the host vehicle 10 that the forward vehicle or vehicles are currently braking and consequently decelerating at a potentially dangerous rate.

The two-way wireless communications system 21 includes communication interface circuitry that connects and exchanges information with a plurality of the vehicles 10*a* that are similarly equipped as well as with the roadside units 16 through a wireless network within the broadcast range of the host vehicle 10. The two-way wireless communications system 21 is configured and arranged to conduct direct two way communications between vehicles (vehicle-to-vehicle communications) and roadside units (roadside-to-vehicle communications). Moreover, two-way wireless communications system 21 is configured to periodically broadcast a signal in the broadcast area. The two-way wireless communication system 21 is an on-board unit that has both an omni-directional antenna and a multi-directional antenna.

In particular, the two-way wireless communications system 21 is preferably a dedicated short range communications systems, since the latency time between communications is very low compared to most other technologies that are currently available. However, other two-way wireless communications systems can be used if they are capable of conducting both point-to-point wireless communications and broadcast wireless messages in a limited broadcast area so log as the latency time between communications is short enough. When the two-way wireless communications system 21 is a DSRC system, the two-way wireless communications system 21 will transmit at a 75 Mhz spectrum in a 5.9 GHz band with a data rate of 1 to 54 Mbps, and a maximum range of about 1,000 meters. Preferably, the two-way wireless communications system 21 includes seven (7) non-overlapping channels. The two-way wireless communications system 21 will be assigned a Medium Access Control (MAC) address and/or an IP address so that each vehicle in the network can be individually identified.

The two-way wireless communications system 21 is configured to periodically broadcast a standard or common message set (CMS) to the neighboring or nearby vehicles 10*a* and the nearby roadside units 16 that within a prescribed broadcast range of the host vehicle 10. This common message set (CMS) would mostly likely be developed such that all of the DSRC equipped vehicles 10 and 10*a* would transmit the same type of vehicle parameter identifiers to give relevant kinematical and location information. In other words, preferably a standardized DSRC message set and data dictionary would be established for safety applications that utilize vehicle-to-vehicle and/or vehicle-to-infrastructure communications, For example, the common message set can include preset vehicle parameter identifiers, such as a MAC address, an IP address and/or a vehicle ID number, and variable vehicle parameter identifiers indicative of vehicle location and movement such as a GPS location/vehicle position (longitude, latitude and elevation) with a GPS time stamp, a vehicle heading, current braking action(s) and/or a vehicle speed. As explained below, the two-way wireless communications system 21 is also configured to broadcast a full kinematics message to the neighboring vehicles 10*a* and/or a signal that indicates the operational status of the vehicle. For example, if the brakes of the vehicle are suddenly applied either with rapid force and/or extreme force causing rapid deceleration of the vehicle, then the message broadcast by the two-way wireless communications system 21 can include such information. This full kinematics message can include the data of the common message set as well as additional relevant kinematics information such as a vehicle type/class, a vehicle size (length, width and weight), a vehicle acceleration, a vehicle brake position, a vehicle throttle position, a vehicle steering wheel angle, current braking action(s) etc.

Generally, the vehicle parameter identifiers including a possible hard brake signal are received and processed by the control unit 20 to determine whether or not sudden hard braking of a forward vehicle is a danger and determine whether or not the operator of the vehicle should be warned of the potential danger. This determination of a potential collision event can be done in the host vehicle 10 and can be done in neighboring vehicles 10*a* receiving the same communications and information. The control unit 20 evaluates information received and determines an appropriate zone of interest 18 based upon combinations of information, such as received information regarding road conditions, received information regarding weather conditions and host vehicle detected conditions, such as road traction, windshield wiper activity, vehicle speed and headlight usage. If a hard braking signal is received from a neighboring vehicle 10*a*, the control unit 20 determines the proximity of the neighboring vehicle 10*a*. If the neighboring vehicle 10*a* is within the determined zone of interest 18, a warning action is implemented providing the operator or driver of the host vehicle 10 with an indication of potential danger ahead.

The global positioning system 22 is a conventional global positioning system that is configured and arranged to receive global positioning information of the host vehicle 10 in a conventional manner. Basically, the global positioning system 22 includes a GPS unit 22A that is a receiver for receiving a signal from the global positioning satellite 18 via and a GPS antenna 22B. The signal transmitted from the global positioning satellite 18 is received at regular intervals (e.g. one second) to detect the present position of the host vehicle 10. The GPS unit 22A preferably has an accuracy of indicting the actual vehicle position within a few meters or less. This data (present position of the host vehicle 10) is fed to the control unit 20 for processing and to the navigation system 23 for processing.

The navigation system 23 is a conventional navigation system that is configured and arranged to receive global positioning information of the host vehicle in a conventional manner. Basically, the navigation system 23 includes a color display unit 23A and an input controls 23B. The navigation system 23 can have its own controller with microprocessor and storage, or the processing for the navigation system 23 can be executed by the control unit 20. In either case, the signals transmitted from the global positioning satellites 14 are utilized to guide the vehicle 10 in a conventional manner.

The map database storage section 24 configured to store road map data as well as other data that can be associated with the road map data such as various landmark data, fueling station locations, restaurants, etc. The map database storage section 24 preferably includes a large-capacity storage medium such as a CD-ROM (Compact Disk-Read Only Memory) or IC (Integrated Circuit) card. The map database storage section 24 is configured to perform a read-out operation of reading out data held in the large-capacity storage medium in response to an instruction from the control unit 20 and/or the navigation system 23. The map database storage section 24 is used by the control unit 20 to acquire the map information necessary as needed and or desired for use in predicting a collision. The map database storage section 24 is also used by the navigation system 23 to acquire the map information necessary for route guiding, map display, and direction guide information display. Preferably, the map information of this embodiment includes at least information necessary for offering of the map information and route guiding as performed by a general navigation device and necessary for displaying the direction guide information of the embodiment. The map information also includes at least road links indicating connecting states of nodes, locations of branch points (road nodes), names of roads branching from the branch points, and place names of the branch destinations, and has such a data structure that, by specifying a location of interest, information on the corresponding road and place name can be read. The map information of the map database storage section 24 stores road information for each road link or node. The road information for each road link or node includes identification information of a road such as a road name, attribute information (road type—local road, unrestricted access, restricted access, bridge, tunnel, roundabout, etc.), a road width or number of lanes, a connection angle of a road at a branch point, and etc, Since it is desirable to have the position information, as accurate as possible for the vehicles 10 and 10*a*, the global positioning system 22 can be use together with the navigation system 23 and/or the map database storage section 24 to enhance the accuracy of the data and local weather information.

The array of in-vehicle sensors 26 are configured to monitor various devices, mechanisms and systems within the host vehicle 10 and provide information relating to the status of those devices, mechanisms and systems to the control unit 20. For example, the in-vehicle sensors 26 are connected to a traction control system 40, a windshield wiper motor 42 or wiper motor controller (not shown), a headlight controller 44, a speedometer 46 and/or a braking system 48.

The control unit 20 of the forward vehicle brake warning system 12 operates and processes information as follows. The incoming message receiving component of the control unit 20 processes signals and messages from the two-way wireless communications system 21 received from the roadside units 16 and the neighboring vehicles 10*a* that are within transmission receiving distance. All the information in the messages and signals is provided to and stored by the control unit 20 for processing.

The adverse driving condition obtaining component of the control unit 20 processes signals and messages from the two-way wireless communications system 21 received from the roadside units 16 to obtain weather related information and/or road condition related information designating road and/or visibility conditions. Road conditions can include such information as icy, rainy, wet, snow covered, etc. Visibility conditions can include foggy, precipitation limiting visibility, dark, etc. The control unit 20 correlates the received road and/or weather information using the global positioning system 22 and navigation system 23 to confirm that the local weather and/or road condition information is relevant to the location of the host vehicle 10.

Figure 6:
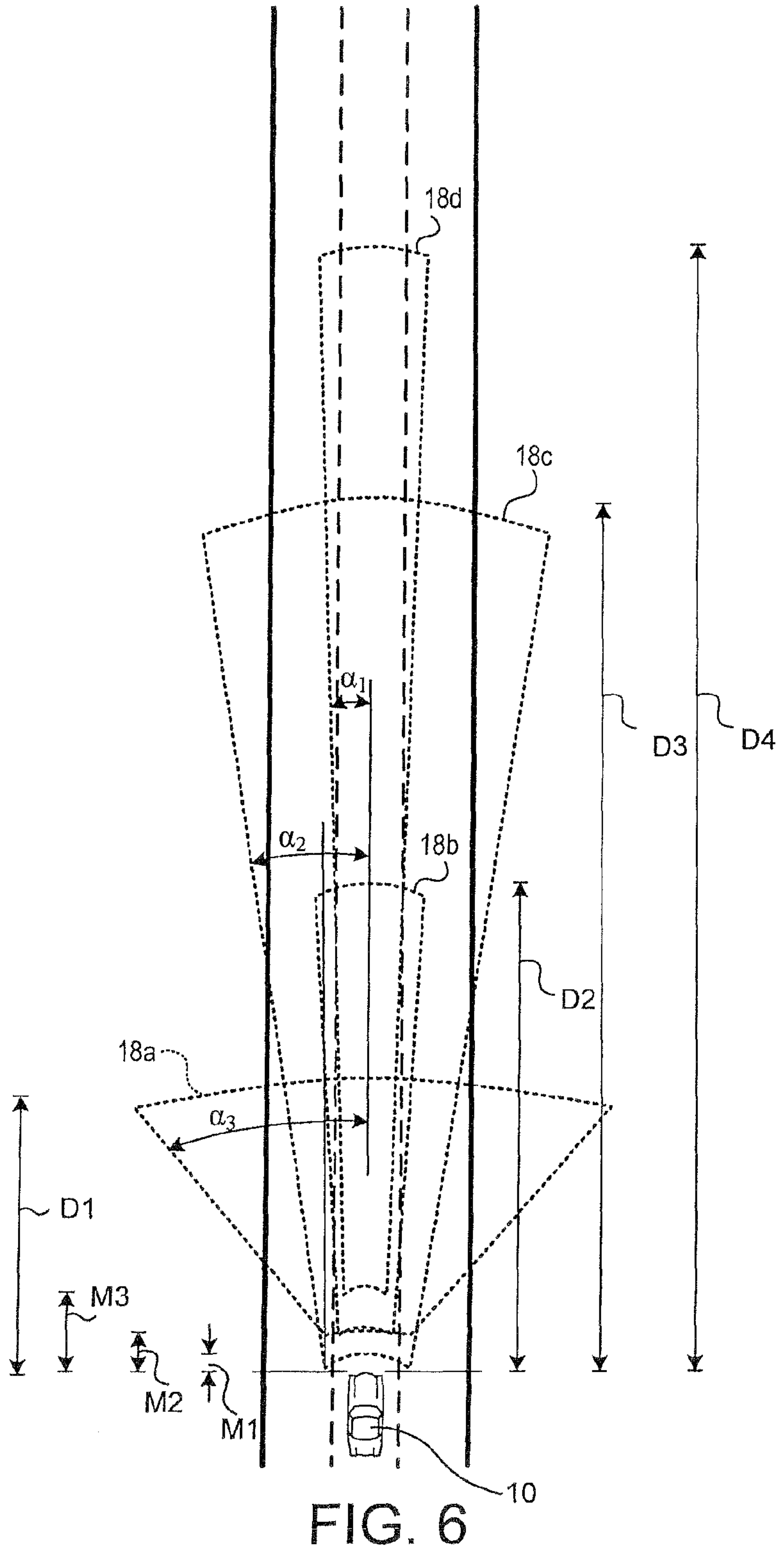
FIG. 6 is a schematic representation of the host vehicle on a highway showing a plurality of adjusted zones of interest, each zone of interest corresponding to differing combinations of road conditions, visibility conditions and/or vehicle operating conditions in accordance with the present invention.

The relevancy adjustment component of the control unit 20 is configured to adjust a relevancy determination to selectively filter the hard brake messages received depending upon received or determined adverse driving condition information. Specifically, the relevancy adjustment component is configured to adjust the relevancy determination by selectively adjusting the dimensions of the prescribed zone of interest. The dimensions of the zone of interest can be changed using factors such as road conditions, weather conditions and or vehicle operating conditions. For example, the dimensions of the zone of interest 18 can be adjusted based upon a detected host vehicle speed. Specifically, FIG. 6 shows a host vehicle 10 an initial or default zone of interest 18*a* and several of many possible zones of interest 18*b*, 18*c* and 18*d*. The zones of interest shown in FIG. 6 are merely a few examples of many differing size and shapes of the zone of interest. The shape and dimensions of the zone of interest are determined by various factors, as explained below.

The initial or default zone of interest 18*a* has a first maximum ahead distance $D_1$ where the first maximum ahead distance $D_1$ represents an area forward or in front of the host vehicle along a current path or trajectory of the host vehicle. The dimensions of the zone of interest can, for example, be increase to have a maximum ahead distance $D_2$, $D_3$ or $D_4$ depending upon a detected the speed of the host vehicle 10.

The relevancy adjustment component of the control unit 20 is configured to adjust the relevancy determination by selectively changing the maximum ahead distance of the prescribed zone of interest relative to the host vehicle when the adverse driving condition obtaining component determines a visibility impaired road condition. Specifically, if visibility is reduce by, for instance, rain, snow or fog, the zone of interest 18*a* can be revised from having a maximum ahead distance $D_1$ to having a maximum ahead distance ahead distance $D_2$, $D_3$ or $D_4$, as shown in FIG. 6. The relevancy adjustment component is further configured to adjust the relevancy determination by selectively changing a minimum ahead distance of the prescribed zone of interest 18 relative to the host vehicle 10. Examples of minimum ahead distances $M_1$, $M_2$ and $M_3$ are shown in FIG. 6, although it should be understood that the minimum ahead distance is variable.

The relevancy adjustment component is further configured to adjust the relevancy determination by selectively changing a lateral angle of view of the prescribed zone of interest 18 relative to the host vehicle, For instance as shown in FIG. 6, an initial lateral angle of view $\alpha_1$ can be increased to lateral angle of view $\alpha_2$ or lateral angle of view $\alpha_3$ when the adverse driving condition obtaining component determines a low friction road condition. It should be understood that combinations of adjustments are made in response to a variety of information either received or detected. It should also be understood that the examples given above and in FIG. 6 of the minimum and maximum distances and the lateral angles are demonstrations of the possible adjustments made by the control unit 20 to the zone of interest 18, and are not meant to limit the zone of interest to a specific shape or configuration. In other words, the determined or adjusted dimensions of the zone of interest 18 depend upon the various data processed, as described above, and appropriate safety concerns, such as, for example, weight of the host vehicle 10, tire traction and relative stopping distances for various speeds of the host vehicle 10

The incoming message relevancy component is configured to perform a relevancy determination of the hard brake messages received based on whether the hard brake messages received are from neighboring vehicles 10*a* that are within the prescribed zone of interest 18 in front of the host vehicle 10. If the neighboring vehicle is located within the zone of interest, then a driver warning is issued by the control unit 20.

Figure 4:
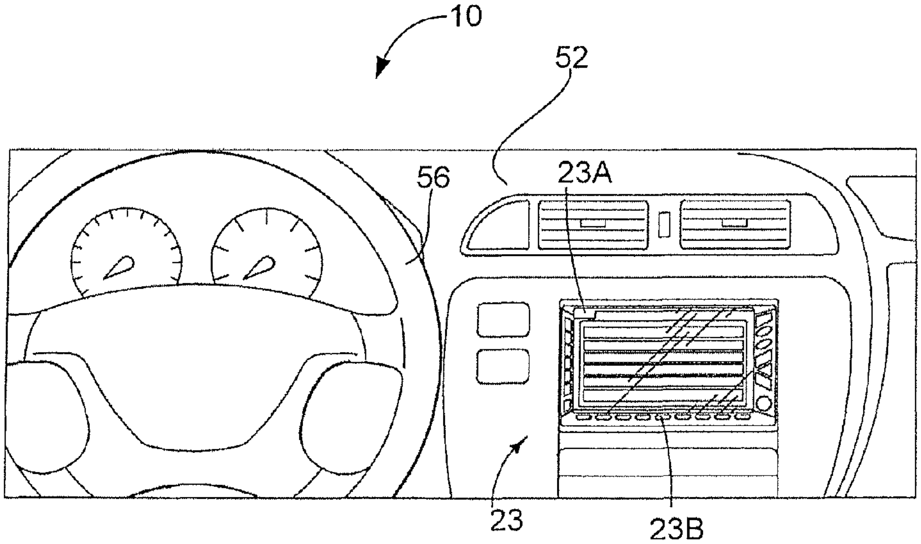
FIG. 4 is an inside elevational view of a portion of the vehicle's interior that is equipped with the on-board unit for conducting two-way wireless communications in accordance with the present invention.
Figure 5:
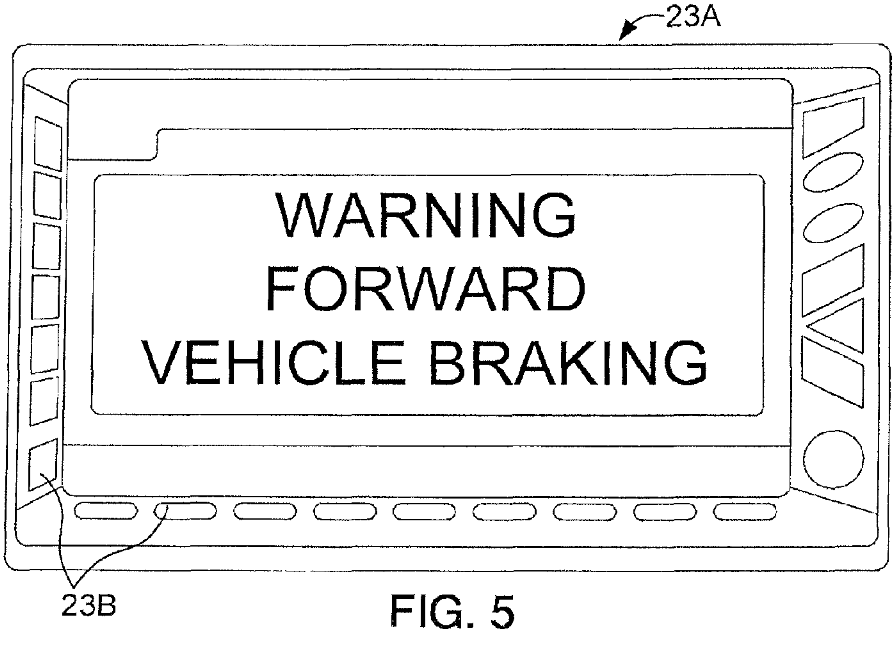
FIG. 5 is a pictorial representation of a screen display of the vehicle's navigation system that is integrated with the on-board unit in accordance with the present invention.

The driver warning component of the control unit 20 is configured to alert the driver of the host vehicle based upon the relevancy determination by the incoming message relevancy component. The driver warning component can be configured in any one of a variety of ways. For instance, driver warning component can be configured to produce an audible warning signal to alert the driver. The driver wanting component can alternatively be configured to produce a haptic warning signal to alert the driver. The driver warning component can also be configured to produce a visual warning signal to alert the driver For example, a buzzer or alarm (not shown) can be connected to the control unit 20 to emit a loud warning sound either alone or in concert with other warning signals. Alternatively or in addition to, a light in the dashboard 52 (shown in FIG. 4) of the host vehicle 10 can light up to alert the operator of the host vehicle 10. Also, a printed message can appear on the display 23A (FIGS. 3, 4 and 5) on the dashboard 52 alerting the operator or driver to an imminent danger ahead either alone or in concert with other warning signals. In still another alternative configuration, a steering wheel 56 can be adapted to vibrate in order to provide a warning signal to the operator or driver of the host vehicle 10 either alone or in concert with other warning signals. Further, the control unit 20 can alternatively activate various vehicle subsystems 38 (FIG. 3) in a coordinated effort to mitigate occupant injuries during a collision based on the information received.

Finally, the braking condition detection component is configured to detect a hard brake condition or operation in the host vehicle. If the brakes 48 within the vehicle have been aggressively applied, the two-way wireless communications system 21 (a communication component) broadcasts a hard brake message to the neighboring vehicles located within the prescribed communication region around the host vehicle.

Figure 7:
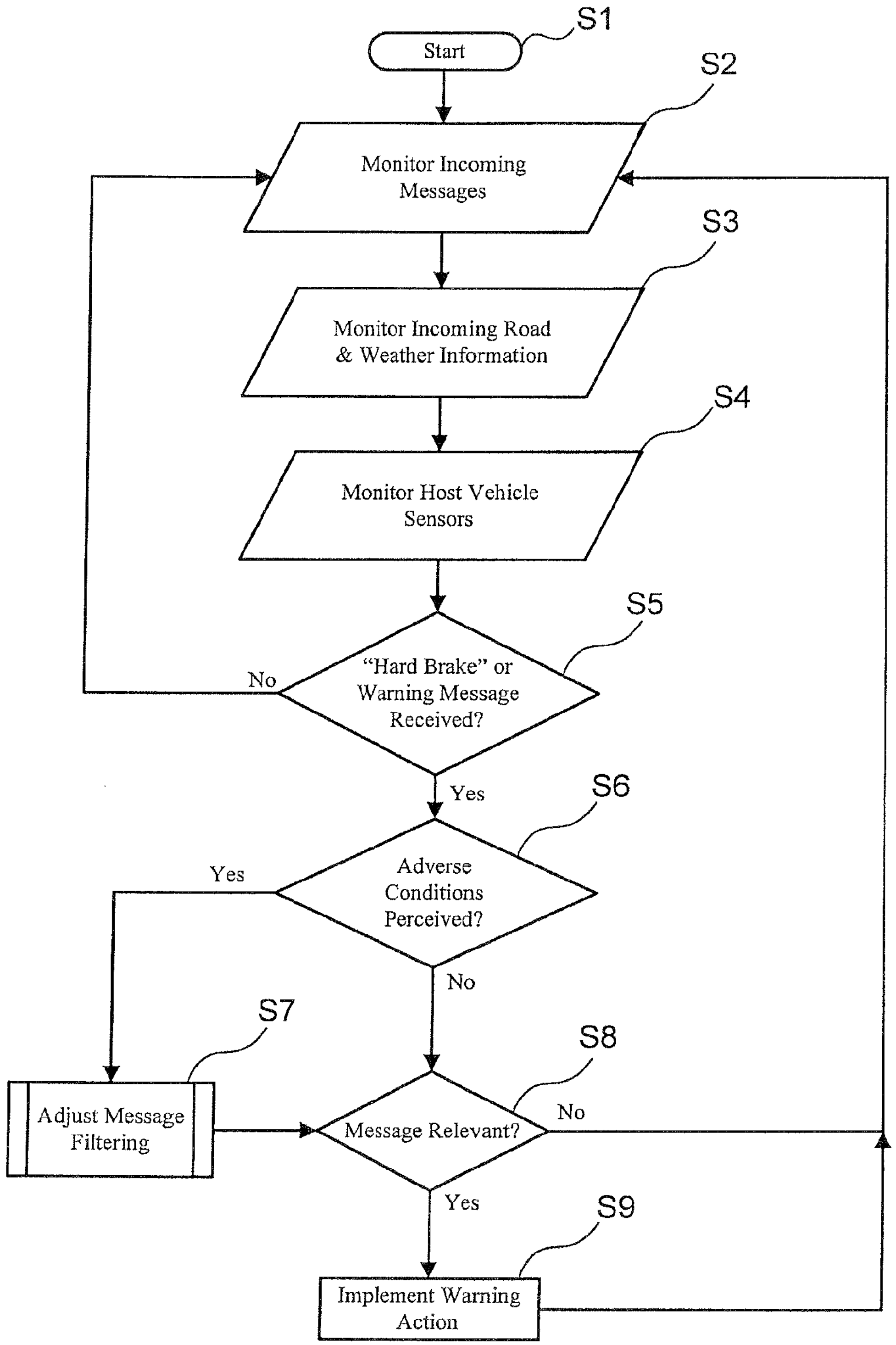
FIG. 7 is a first flow chart illustrating an overall process executed by the control unit for determining whether or not neighboring vehicles are located within a zone of interest forward from the host vehicle, and whether or not to provide a warning signal to the operator of the host vehicle in response to receiving hard braking signals from neighboring vehicles determined to be within the zone of interest in accordance with the present invention.

Referring now to FIG. 7, one possible process that can be executed by the control unit 20 to carry out the present invention will now be discussed. In the flow chart of FIG. 7, the steps are preferably being performed by the control unit 20 of the host vehicle 10, along with various other apparatus and mechanisms within the vehicle 10.

In step S1, the control unit 20 begins the process, preferably as the host vehicle 10 is set in motion. In step S2, the control unit 20 is configured to instruct the two-way wireless communications system 21 of the host vehicle 10 to monitor incoming messages and identify those messages that include any of signals corresponding to the common message set with current vehicle parameter identifiers from neighboring vehicles 10*a*, as discussed above, as well as its MAC address and/or IP address. The common message set can include a hard brake message indicating that the transmitting neighboring vehicle 10*a* is currently braking. The neighboring vehicle 10*a* transmitting such signal(s) is within the prescribed communication region around the host vehicle 10 and is equipped with the forward vehicle brake warning system 12 of the present invention. Step S2 at least partially represents the incoming message receiving component of the host vehicle 10. Then the processing executed by the control unit 20 of the host vehicle 10 proceeds to step S3.

In step S3, the control unit 20 monitors incoming road and/or weather information remotely broadcasted or transmitted by one or both of the satellites 14 and the roadside units 16 and received via the two-way wireless communications system 21 and/or the global positioning system 22. The information received can be weather related information and/or road condition related information designating conditions such as icy, rainy, wet, snow covered, etc. The control unit 20 correlates the received road and/or weather information using the global positioning system 22 and navigation system 23 to confirm that the local weather and/or road condition information is relevant to the location of the host vehicle 10. The operations performed in step S3 at least partially represent the adverse driving condition obtaining component of the host vehicle 10.

In step S4, the control unit 20 monitors the various conditions detected by each of the in-vehicle sensors 26. The in-vehicle sensors 26 can be connected to any of a variety of mechanical and electrical systems within the vehicle, such as the traction control system 40, the windshield wiper motor 42, the headlight controller 44 and/or the speedometer 46. Consequently, the control unit 20 can be provided with information concerning one or more of the following: road traction conditions from the traction control system 40, rain conditions from the speed and duration of use of the windshield wiper motor 42, whether it is dark or not from the headlight controller 44 and/or the relative speed of the host vehicle 10 from the speedometer 46. The operations performed in step S4 by the control unit 20 also at least partially represent the adverse driving condition obtaining component and a host vehicle operating state section of the host vehicle 10. As such, the host vehicle operating state section monitors the various systems of the host vehicle 10 and provides a signal or information indicative of the host vehicle operating state for subsequent use by the control unit 20.

Next, in step S5, the control unit 20 determines whether or not the messages received in step S2 included any hard brake signals or warning messages from neighboring vehicle(s) 10*a*. If no such messages have been received, then the control unit 20 returns to steps S2, S3 and S4. If in step S5 such a message has been received, then the control unit 20 moves to step S6.

In step S6, the control unit 20 is configured to determine whether or not any adverse conditions relating to road or weather conditions have been perceived via the information received in any of steps S2, S3 or S4. If adverse conditions are present, the control unit 20 moves to step S7, where message filtering or relevancy adjustment can be made. The message filtering performed in step S7 can implement, for example, re-evaluation and re-sizing of the zone of interest 18. The operations performed in step S7 are described in greater detail below with respect to FIGS. 8-11. In step S6, if no adverse conditions are perceived, then operations of the control unit 20 move to step S8.

In step S8 the control unit 20 determines whether or not the hard braking condition signal received from neighboring vehicle(s) 10*a* is relevant or not. Specifically, the control unit 20 determines whether the neighboring vehicle(s) 10*a* that transmitted the hard braking condition signal is located within the prescribed zone of interest 10. If neighboring vehicle 10*a* that sent the hard brake condition signal is located within the zone of interest, then operations of the control unit 20 move to step S9. The operations of the control unit 20 at step S8 at least partially represent the incoming message relevancy component of the present invention. The incoming message relevancy component is configured to perform a relevancy determination of the hard brake messages received based on whether the hard brake messages received are from neighboring vehicles 10*a* that are within the prescribed zone of interest 18 in front of the host vehicle 10.

At step S9, the control unit 20 implements a warning action by providing instructions to the warning indicator 30 to start a warning action. The warning action can include any of a variety of actions as described above. Operations in either or both of steps S8 and S9 at least partially correspond to the driver warning component of the present invention.

At step S8, if the control unit 20 determines that the neighboring vehicle 10*a* that transmitted the hard brake condition signal is not located within the prescribed zone of interest 10, then operations return again to steps S2, S3 and S4.

Figure 8:
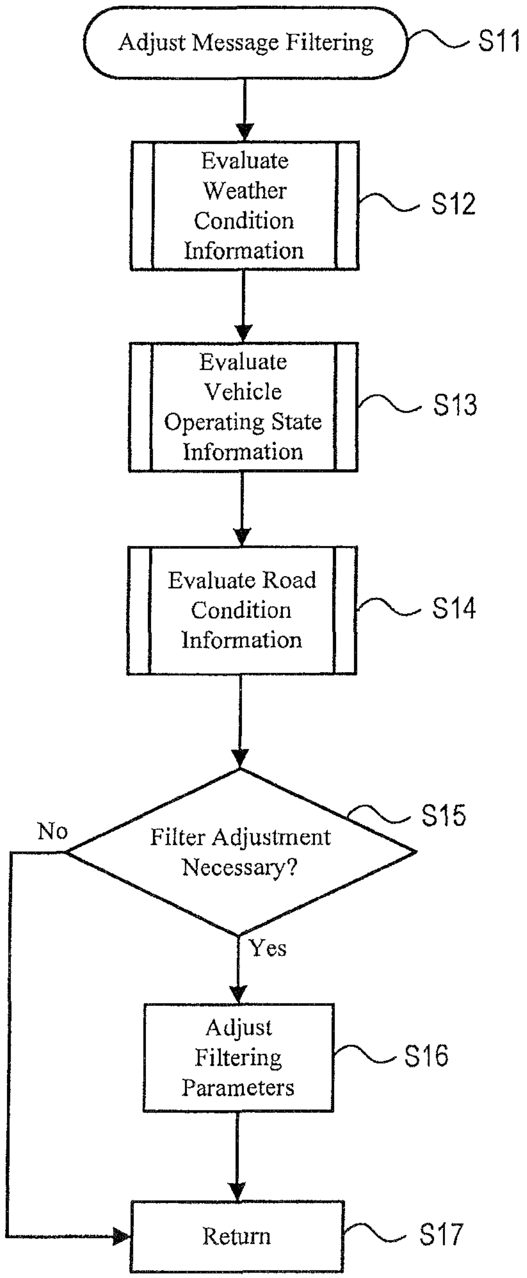
FIG. 8 is a second flow chart illustrating a portion of the overall process depicted in FIG. 7 executed by the control unit to determine whether or not to adjust dimensions of the zone of interest in accordance with the present invention.

Referring now to FIG. 8, the operations of the control unit 20 at step S7 in FIG. 7 are now described in greater detail. The operations of the control unit 20 described below with respect to FIG. 8, and also FIGS. 9 through 11, generally represent the relevancy adjustment component of the present invention.

At step S11, the relevancy adjustment process begins. At step S12, all weather condition information, in particular, information that relates to visibility conditions and traction (road) conditions is processed as further described below with reference to FIG. 9.

Figure 10:
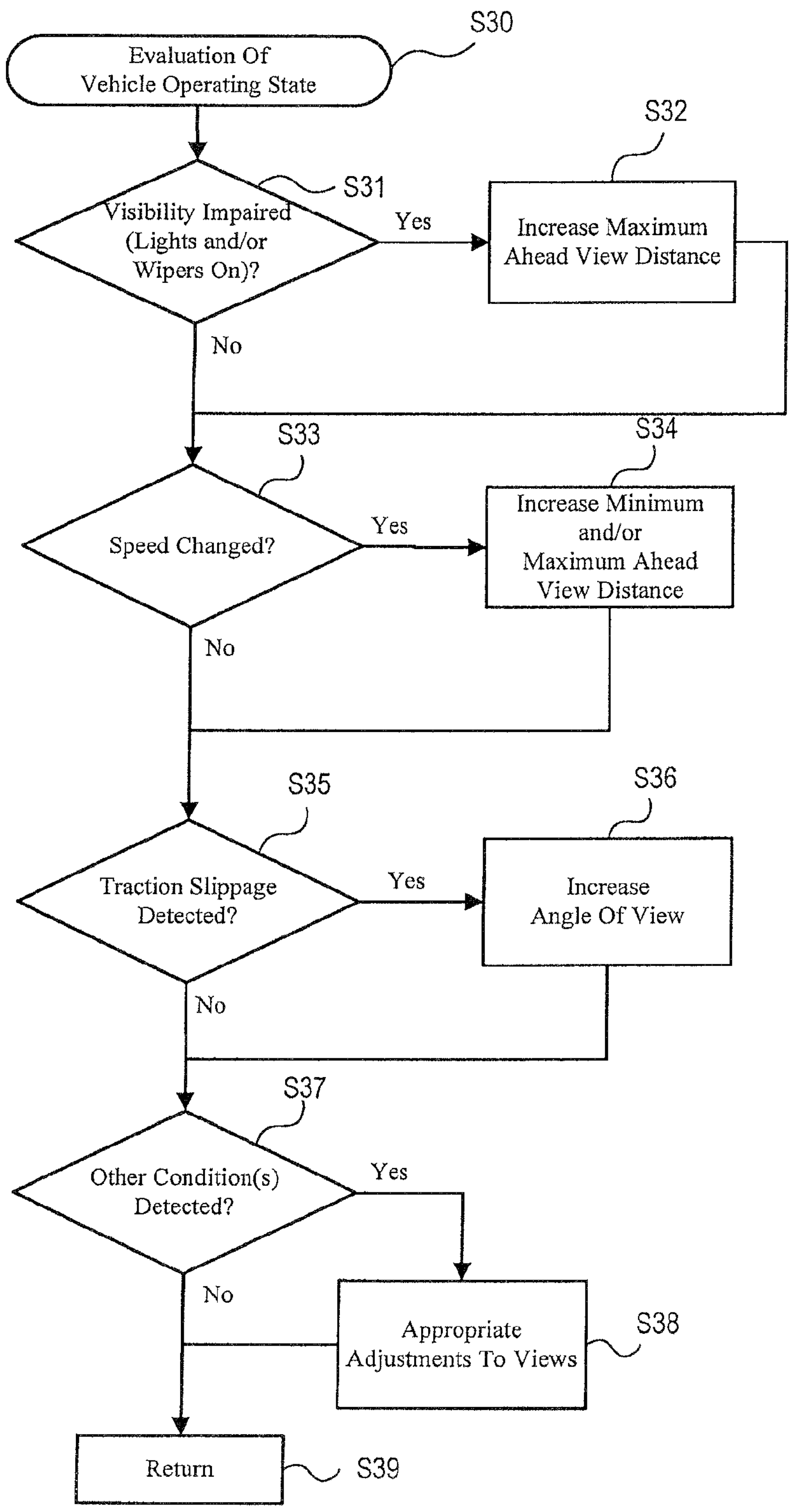
FIG. 10 is a fourth flow chart illustrating another portion of the overall process depicted in FIG. 7 executed by the control unit to determine whether or not to adjust dimensions of the zone of interest in response to vehicle operating state information in accordance with the present invention.

At step S13, all vehicle operating state information, in particular, information that relates to visibility conditions, speed and traction (road) conditions is processed as further described below with reference to FIG. 10.

Figure 11:
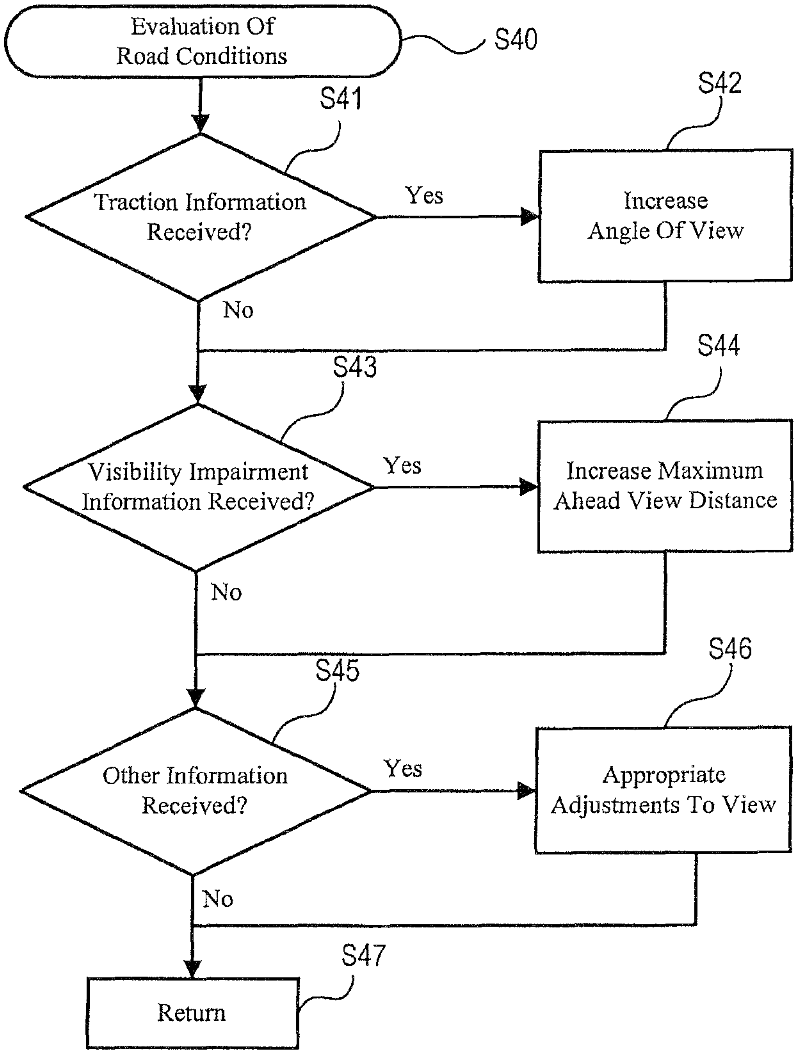
FIG. 11 is a fifth flow chart illustrating another portion of the overall process depicted in FIG. 7 executed by the control unit to determine whether or not to adjust dimensions of the zone of interest in response to road condition information in accordance with the present invention.

At step S14, all road condition information, in particular, information that relates to traction (road) conditions and visibility conditions is processed as further described below with reference to FIG. 11.

At step S15 a determination is made by the control unit 20. Based upon the indications stored in memory during processing of any or all of steps S12, S13 and/or S14 (described below), the control unit determines whether or not the zone of interest needs to be adjusted or re-dimensioned. Changes to the zone of interest 18 are changes to the message filtering process or message relevancy determining process. If indications recorded in memory show that an adjustment is necessary, the zone of interest is adjusted in step S16 for subsequent use at step S8 in FIG. 7 for determining the relevancy of a received hard brake message. After adjustment, or if no adjustment is necessary, operations return at step S17 to the determining step S8 in FIG. 7.

Figure 9:
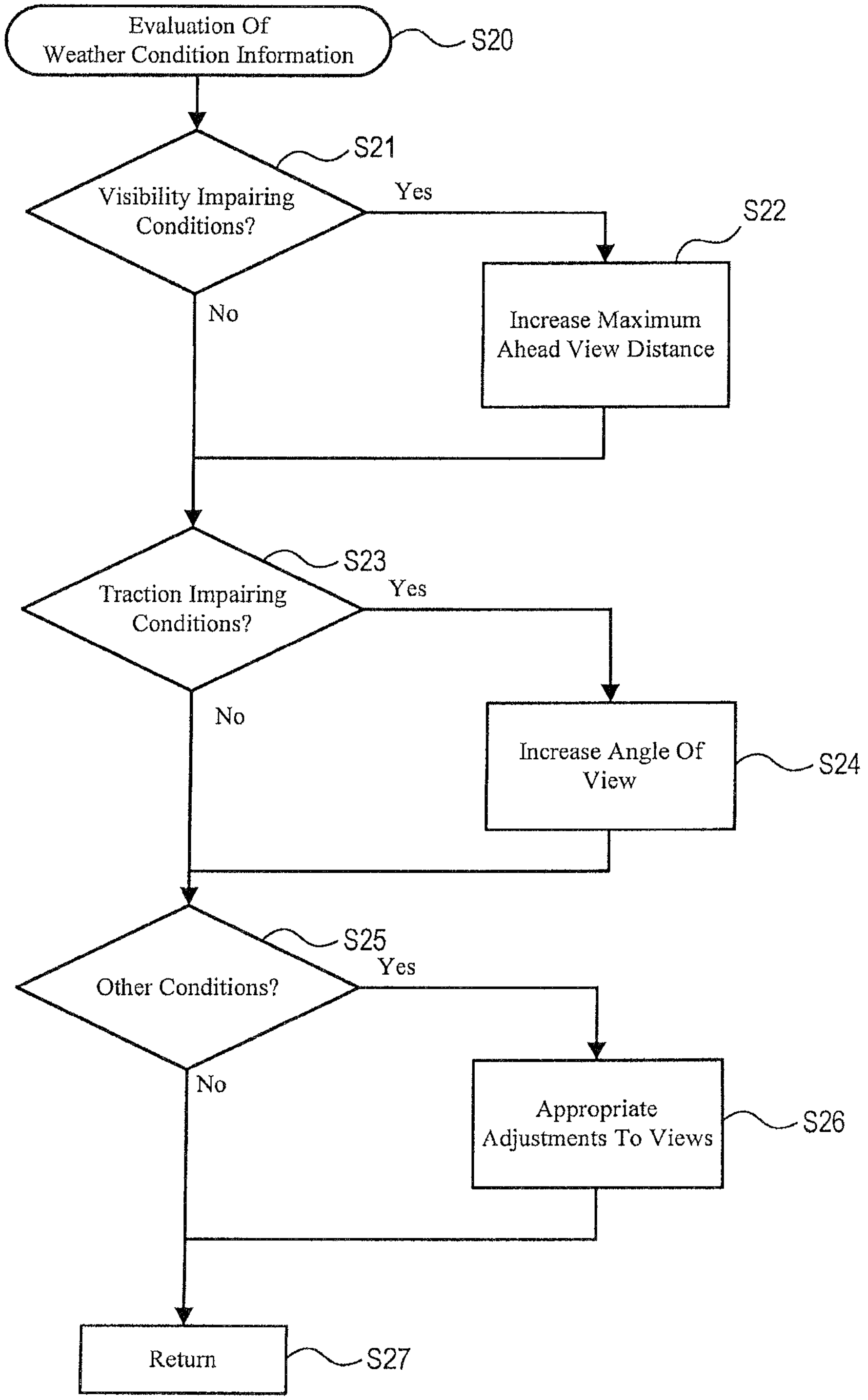
FIG. 9 is a third flow chart illustrating another portion of the overall process depicted in FIG. 7 executed by the control unit to determine whether or not to adjust dimensions of the zone of interest in response to weather condition information in accordance with the present invention.

The process represented at step S12 in FIG. 8 is now described in greater detail below with reference to FIG. 9. At step S20 in FIG. 9, a process is begun that evaluates received weather condition related information. A determination is made at step S21 whether or not received weather related information indicates visibility impairing conditions. If visibility impairing conditions are likely present, operations move to step S22 where an indication is put in memory that the zone of interest should be re-dimensioned by increasing the maximum ahead view distance. If visibility impairing conditions are not present in step S21, operations move to step S23. At step S23, a determination is made whether or not received weather related information indicates traction impairing conditions. If traction impairing conditions are likely present, operations move to step S24 where an indication is put in memory the zone of interest should be re-dimensioned by increasing the angle of view. If traction impairing conditions are not present in step S23, operations move to step S25. At step S25 other conditions can be considered and if such conditions are present appropriate adjustments to the zone of interest can be indicated in memory at step S26. At step 27, operations return to FIG. 8 and proceed to step S13.

The process represented at step S13 in FIG. 8 is now described in greater detail below with reference to FIG. 10. At step S30 in FIG. 10, a process is begun that evaluates host vehicle operating state related information. A determination is made at step S31 whether or not received host vehicle operating state related information indicates visibility impairing conditions, such as rain (windshield wipers on) or dark (headlights on). If visibility impairing conditions are likely present, operations move to step S32 where an indication is put into memory that the zone of interest should be re-dimensioned by increasing the maximum ahead view distance. If visibility impairing conditions are not present in step S31, operations move to step S33. At step S33, a determination is made whether or not the host vehicle speed has changed. If the speed of the host vehicle has changed, then operations move to step S34 where an indication is put into memory that the zone of interest should be re-dimensioned by increasing or decreasing the minimum and/or maximum ahead view distances. If the speed has increased the maximum ahead view distance can be increased. If the speed decreases, the maximum ahead view distance can be decreased. If the host vehicle speed has not changed, operations move to step S35. At step S35, a determination is made whether or not the traction control system 40 is experiencing traction slippage. If traction impairing conditions are present, operations move to step S36 where an indication is put into memory that the zone of interest should be re-dimensioned by increasing the angle of view. If traction impairing conditions are not present in step S35, operations move to step S37. At step S37 other conditions can be considered and if such conditions are present appropriate adjustments to the zone of interest can be made at step S38. At step 39, operations return to FIG. 8 and proceed to step S14.

The process represented at step S14 in FIG. 8 is now described in greater detail below with reference to FIG. 1. At step S40 in FIG. 11, a process is begun that evaluates received road condition related information (for example, as received from transmissions from the roadside units 16). A determination is made at step S41 whether or not received road related information is traction impairment information. If traction impairment information has been received, operations move to step S42 where an indication is put into memory that the zone of interest should be re-dimensioned by increasing the angle of view. At step 43, a determination is made whether or not received road related information is visibility impairment information. If visibility impairment information has been received, operations move to step S44 where an indication is put into memory that the zone of interest should be re-dimensioned by increasing the maximum ahead view distance. At step S45 other information can be considered and if such information is received and appropriate adjustments to the zone of interest are necessary, such adjustments are recorded in memory at step S46. At step 47, operations return to FIG. 8 and proceed to step S15.

Figure 12:
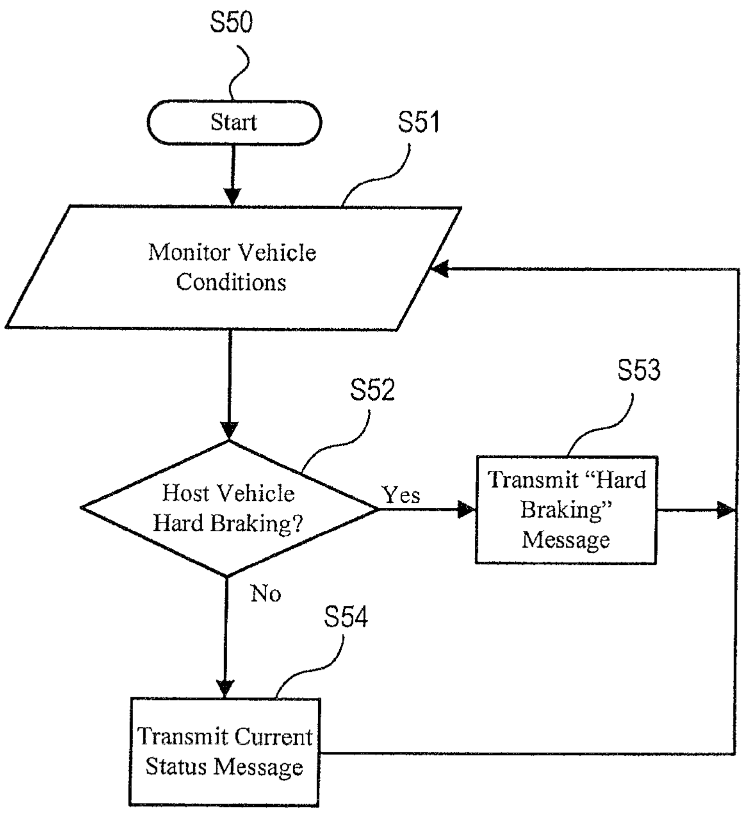
FIG. 12 is a second flow chart illustrating the processing executed by the control unit to determine whether or not to transmit a hard brake warning signal to neighboring vehicles in response to detected hard braking conditions in the host vehicle in accordance with the present invention.

The braking condition detection component operation by the control unit 20 is now described with reference to FIG. 12. At step S50, the process begins. At step S51 the control unit 20 monitors various conditions within the host vehicle 10. Among other parameters, the control unit 20 monitors the condition of the brakes 48. At step S52 if a hard braking condition is detected in the brakes 48, operations move to step S53 where a hard brake signal is transmitted to neighboring vehicles 10*a*. If no hard brake condition is present in step S52, operations move to step S54 where a current status message composed from the common message set is transmitted to neighboring vehicles 10*a*. The operations carried out in FIG. 12 preferably continue in parallel (at the same time) as the operations described above with respect to FIGS. 8-11.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A forward vehicle brake warning system comprising:

an incoming message receiving component that receives hard brake messages from neighboring vehicles located within a prescribed communication region around a host vehicle equipped with the forward vehicle brake warning system, each of the hard brake messages including a vehicle location of a corresponding one of the neighboring vehicles and a hard brake indication;

an incoming message relevancy component that performs a relevancy determination, based on the vehicle location of the neighboring vehicle sending the hard brake messages received by the incoming message receiving component, determining the hard brake messages are relevant in response to the vehicle location being within an adjustable zone of interest, determining the hard brake messages are irrelevant in response to the vehicle location being outside the adjustable zone of interest, filtering out irrelevant hard brake messages and retaining relevant messages, the adjustable zone of interest being an area in front of the host vehicle that is bound by a maximum distance ahead measured from the front of the host vehicle forward along a current trajectory of the host vehicle and a lateral dimension measured relative to the front of the host vehicle side-to-side from the current trajectory of the host vehicle;

a relevancy adjustment component that adjusts the relevancy determination by selectively changing the maximum distance ahead of the adjustable zone of interest relative to the host vehicle and changing the lateral dimension to selectively filter the hard brake messages received such that in response to a decrease in the maximum distance, the lateral dimension is increased and in response to an increase in the maximum distance the lateral dimension is decreased; and a driver warning component that alerts a driver of the host vehicle with a warning signal in response to relevant messages identified during the relevancy determination by the incoming message relevancy component.

2. The forward vehicle brake warning system as set forth in claim 1, wherein the relevancy adjustment component selectively changes the maximum distance in response to changes in visibility impairing conditions.

3. The forward vehicle brake warning system as set forth in claim 1, further comprising an adverse driving condition obtaining component that receives driving condition information affecting drivability of the host vehicle, wherein the relevancy adjustment component adjusts the relevancy determination based on the driving condition information; and wherein the relevancy adjustment component selectively changes the lateral dimension view in response to changes in traction impairing conditions.

4. The forward vehicle brake warning system as set forth in claim 1, wherein the adjustable zone of interest is further bound by a minimum distance ahead measured from the front of the host vehicle forward along a current trajectory of the host vehicle such that the incoming message relevancy component determines whether or not the hard brake messages are relevant in response to the vehicle location being within the adjustable zone of interest between the minimum distance and maximum distance, and determines the hard brake messages are irrelevant in response to the vehicle location being outside the adjustable zone of interest.

5. The forward vehicle brake warning system as set forth in claim 4, wherein the relevancy adjustment component further adjusts the relevancy determination by selectively changing the minimum distance of the adjustable zone of interest relative to the host vehicle.

6. The forward vehicle brake warning system as set forth in claim 1, wherein the relevancy adjustment component adjusts the relevancy determination based on a detected host vehicle speed.

7. The forward vehicle brake warning system as set forth in claim 1, further comprising an adverse driving condition obtaining component that receives driving condition information affecting drivability of the host vehicle, wherein the relevancy adjustment component adjusts the relevancy determination based on the driving condition information.

8. The forward vehicle brake warning system as set forth in claim 7, wherein the adverse driving condition obtaining component further includes a host vehicle operating state section that detects a host vehicle operating state of the host vehicle as the driving condition information.

9. The forward vehicle brake warning system as set forth in claim 8, wherein the host vehicle operating state section detects operation of a host vehicle traction control system as the host vehicle operating state.

10. The forward vehicle brake warning system as set forth in claim 8, wherein the host vehicle operating state section detects operation of a host vehicle windshield wiper system as the host vehicle operating state.

11. The forward vehicle brake warning system as set forth in claim 7, wherein the adverse driving condition obtaining component further includes a weather condition receiving section that detects weather conditions of the host vehicle as the driving condition information.

12. A forward vehicle brake warning system comprising:

an incoming message receiving component that receives hard brake messages from neighboring vehicles located within a prescribed communication region around a host vehicle equipped with the forward vehicle brake warning system;

an incoming message relevancy component that performs a relevancy determination of the hard brake messages received by the incoming message receiving component, filtering out irrelevant hard brake messages transmitted from neighboring vehicles outside an adjustable zone of interest and retaining relevant messages transmitted from neighboring vehicles within the adjustable zone of interest, the adjustable zone of interest being an area in front of the host vehicle that is bound by a maximum distance ahead measured from the front of the host vehicle forward along a current trajectory of the host vehicle and a lateral dimension measured relative to the front of the host vehicle side-to-side from the current trajectory of the host vehicle;

a relevancy adjustment component that adjusts the maximum distance ahead and the lateral dimension to selectively filter the hard brake messages received, such that in response to a decrease in the maximum distance, the lateral dimension is increased and in response to an increase in the maximum distance the lateral dimension is decreased; and a driver warning component that alerts a driver of the host vehicle with a warning signal in response to relevant messages identified during the relevancy determination by the incoming message relevancy component.

13. The forward vehicle brake warning system as set forth in claim 12, wherein the relevancy adjustment component further adjusts the relevancy determination based on a detected host vehicle speed.

14. The forward vehicle brake warning system as set forth in claim 12, further comprising an adverse driving condition obtaining component that receives driving condition information affecting drivability of the host vehicle, wherein the relevancy adjustment component adjusts the relevancy determination based on the driving condition information.

15. The forward vehicle brake warning system as set forth in claim 14, wherein the relevancy adjustment component selectively changes the maximum distance in response to changes in visibility impairing conditions.

16. The forward vehicle brake warning system as set forth in claim 14, wherein the relevancy adjustment component selectively changes the lateral dimension in response to changes in traction impairing conditions.

17. The forward vehicle brake warning system as set forth in claim 14, wherein the adverse driving condition obtaining component further includes a host vehicle operating state section that detects a host vehicle operating state of the host vehicle as the driving condition information.

18. The forward vehicle brake warning system as set forth in claim 17, wherein the host vehicle operating state section detects operation of a host vehicle traction control system as the host vehicle operating state.

19. The forward vehicle brake warning system as set forth in claim 17, wherein the host vehicle operating state section detects operation of a host vehicle windshield wiper system as the host vehicle operating state.

20. The forward vehicle brake warning system as set forth in claim 14, wherein the adverse driving condition obtaining component further includes a weather condition receiving section that detects weather conditions of the host vehicle as the driving condition information.

21. The forward vehicle brake warning system as set forth in claim 12, wherein the lateral dimension of the adjustable zone of interest is defined by a lateral angle of view of the host vehicle.

22. A forward vehicle brake warning system comprising:

an incoming message receiving component that receives hard brake messages from neighboring vehicles located within a prescribed communication region around a host vehicle equipped with the forward vehicle brake warning system, the hard brake messages each including a vehicle location of the corresponding neighboring vehicle, and a hard brake indication;

an incoming message relevancy component that performs a relevancy determination of the hard brake messages received by the incoming message receiving component determining the hard brake messages are relevant when the vehicle location of the neighboring vehicle sending the hard brake message is within an adjustable zone of interest, and determining the hard brake messages are irrelevant when the vehicle location of the neighboring vehicle sending the hard brake message is outside of the adjustable zone of interest, filtering out irrelevant hard brake messages and retaining relevant messages, the adjustable zone of interest being an area in front of the host vehicle that is bound between a minimum distance, a maximum distance ahead measured from the front of the host vehicle forward along a current trajectory of the host vehicle and a lateral dimension measured relative to the front of the host vehicle side-to-side from the current trajectory of the host vehicle, the minimum distance being spaced apart from the front of the host vehicle and the maximum distance, the maximum distance being confined to a length smaller than the distance to areas outside the prescribed communication region;

a relevancy adjustment component that adjusts the maximum distance ahead and the lateral dimension to selectively filter the hard brake messages received, such that in response to a decrease in the maximum distance, the lateral dimension is increased and in response to an increase in the maximum distance the lateral dimension is decreased; and a driver warning component that alerts a driver of the host vehicle with a warning signal in response to relevant messages identified during the relevancy determination by the incoming message relevancy component.

* * * * *